United States Patent

Borgstede

[15] 3,646,512
[45] Feb. 29, 1972

[54] VEHICLE TRAILER BED OVERLOAD INDICATING SYSTEM

[72] Inventor: George J. Borgstede, 10537 Stewart Place, New Orleans, La. 70123

[22] Filed: Sept. 1, 1970

[21] Appl. No.: 68,723

Related U.S. Application Data

[63] Continuation-in-part of Ser. No. 640,907, May 24, 1967, abandoned, and a continuation-in-part of 689,157, Dec. 8, 1967, abandoned, and a continuation-in-part of 722,276, Apr. 18, 1968, abandoned.

[52] U.S. Cl. ...................340/52 R, 340/272, 200/61.44, 200/85
[51] Int. Cl. .....................................................G08b 21/00
[58] Field of Search ...............340/52, 61, 272, 282; 200/47, 200/61.42, 61.44, 85; 177/136, 141

[56] References Cited

UNITED STATES PATENTS

| 2,779,013 | 1/1957 | Chotro | 340/52 |
| 2,842,633 | 7/1958 | Roach | 200/85 |

*Primary Examiner*—Alvin H. Waring
*Attorney*—William E. Ford

[57] ABSTRACT

The invention comprises overload sensors comprised of intertelescoped contact carriers for installation between load-supporting areas, as truck beds and the vehicle axle means therebelow that support the leaf spring means which in turn yieldably support the load-supporting area or load bed. The deposit of load on the load-supporting area compresses the leaf spring means and intertelescope the contact carriers to close circuit to sense or render indicia of overload.

10 Claims, 32 Drawing Figures

GEORGE J. BORGSTEDE
INVENTOR

BY Wm. E. Ford

ATTORNEY

GEORGE J. BORGSTEDE
INVENTOR
BY Wm. E. Ford

ATTORNEY

INVENTOR.
GEORGE J. BORGSTEDE
BY: Wm. E. Ford
ATTORNEY

VEHICLE TRAILER BED OVERLOAD INDICATING SYSTEM

The invention relates to overload sensor means actuated to give indication or sensing when a load support area is overloaded; this application further setting forth, as a continuation-in-part application, the invention first disclosed in application Ser. No. 640,907, filed May 24, 1967, and now abandoned; in copending application Ser. No. 689,157, filed Dec. 8, 1967, now abandoned; and in copending application Ser. No. 722,276, filed Apr. 18, 1968, now abandoned.

It is a primary object of the invention to provide overload sensor sets adapted to render a visual and/or other type of warning when an area, as the portion of a trailer bed supported by an axle, is overloaded; thus the trailer load may be redistributed to avoid paying a fine.

It is another and important object of the invention to provide load sensor sets of this class which act, as when the trailer bed urges downwardly against the leaf springs when overloaded, to close an electrical circuit between point of contact carriers connected respectively to the underside of an area of a trailer bed that is overloaded and to axle supported means on which the leaf springs may be based.

It is also an object of the invention to provide overload sensor sets of this class adapted to give ample sensing of overload conditions on the trailer bed of a vehicle, whereby the overload conditions may be remedied before fines may be assessed therefor.

Also it is an object of this invention to provide overload sensor sets of this class employable to indicate overload conditions in cases other than those involved with the trucking and hauling industry.

It is still a further object of the invention to provide overload sensor sets of this class which may provide visual and/or audible indicia of overload, as by gauge means, visual light means, also by audible whistles, sirens, and bells.

It is yet another and most important object of the invention to provide overload sensor means of this class readily, easily and accurately calibrated by virtue of contact carrying arrangement of relatively movable and stationary sensor unit parts.

Other and further objects will be apparent when the specification herein is considered in connection with the drawings, in which.

Figures 1, 2, 7, 8, 9, 10:
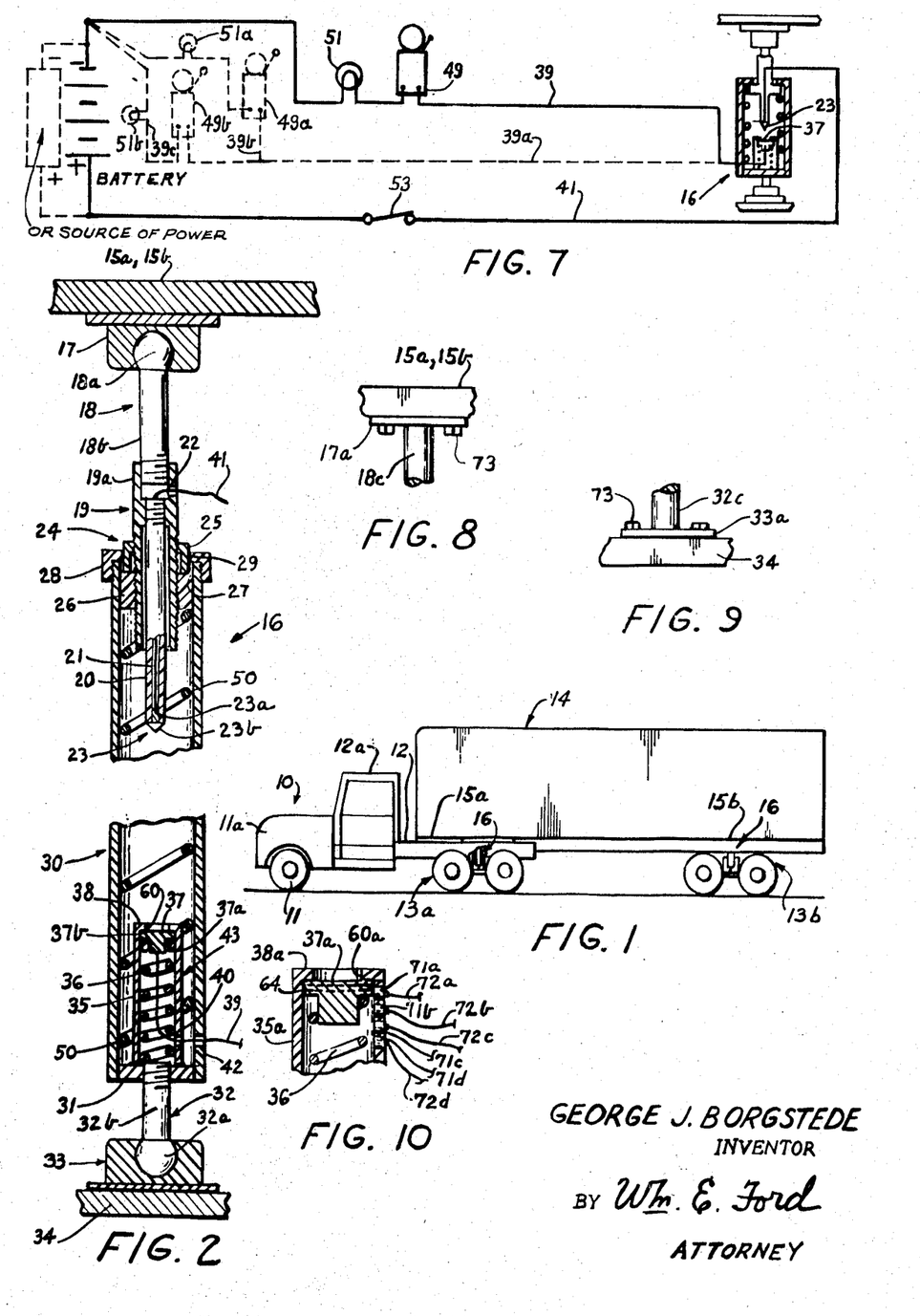
FIG. 1 is a small scale side elevation of a prime mover and trailer with the prime mover tandem unit and the trailer tandem unit each shown supporting overload sensors above their respective axles.
FIG. 2 is an enlarged sectional elevational view showing one embodiment of the invention.
FIG. 7 is an electrical circuit diagram of circuitry and apparatus operable with the apparatus shown in FIG. 2, or in FIG. 12, hereinbelow described.
FIG. 8 is a fragmentary side elevational view of an alternate means of connecting the upper contact carrier of FIG. 2 to the underside of a trailer bed.
FIG. 9 is a fragmentary side elevational view of an alternate means of connecting the lower contact carrier of FIG. 2 to the axle-supported support bar for an overload sensor.
FIG. 10 is an alternative construction of lower contact in which sensing of four successive stages of overload may be successively relayed to indicating indicia.

Referring now in detail to the drawings in which like reference numerals are assigned to like elements in the various views, a prime mover, as a tractor or truck 10, is indicated in FIG. 1 having a front-end wheeled axle unit 11 supporting the vehicle forward end, including the engine 11a. The prime mover or truck 10 is indicated as having a truck bed 12 extending rearwardly of the driver's cab 12a; the rear end of the truck bed 12 being supported by a conventional tandem unit 13a, with the conventional pair of relatively closely spaced-apart, transversely opposed, wheeled axles.

The trailer bed forward end 15a of a trailer 14 fits upon a conventional fifth-wheel assembly, not shown, but mounted on the rear portion of the truck bed 12. The trailer is supported rearwardly by a second conventional tandem unit 13b which is connected beneath the rear portion 15b of the trailer bed. An overload sensor assembly 16 is indicated in small scale as installed between the forward and rear wheeled axles of the forward tandem unit 13a, and also such an overload sensor assembly 16 is indicated as being installed between the forward and rear wheeled axles of the rear tandem unit 13b.

As is well known, the laws of the different states can vary as to the load that may be hauled by a truck or trailer or other vehicle axle or axle assembly. For instance, in Louisiana a weight of 18,000 pounds may be allowed where the load is distributed above a single wheeled axle means such as an axle unit comprised of two opposed wheels with axle means therefor in coaxial alignment, or such as a tandem unit wheeled axle assembly, as the tandem unit 13b.

Then, as in an arrangement shown in FIG. 1, when the forward end of the trailer bed 15a, is supported by another transversely aligned wheeled axle unit, or by a conventional tandem unit 13a, another 14,000 pounds may be allowed to be hauled by the forward end 15a of the trailer bed. On the other hand, the state of Florida allows 20,000 pounds to be hauled forwardly in a trailer as supported by a forward wheeled axle assembly, and also it allows 20,000 pounds for the rear end area of a trailer bed as supported by a rearward wheeled axle assembly.

Obviously, if an overload sensor 16 is provided under the forward end portion of a trailer bed 15a, as indicated by the reference number 16 in FIG. 1, and if a rearward overload sensor 16 is installed centrally above a rearward tandem unit 13b and beneath the rearward portion 15b of the trailer, such overload sensors, if properly operated, can sense immediately when overload begins to occur upon a trailer bed area above a respective overload sensor.

An overload sensor 16, which s well adapted to carry out the purposes of warning of, or sensing for such overload, is best shown in detail in FIG. 2. In such case the overload sensor 16, disposed centrally along the longitudinal center line of a trailer bed, includes a universal socket 17 mounted by machine screws, not shown, to the underside of an area 15a, 15b, of a truck trailer 14. The ball 18a of a ball joint 18 is conventionally received in the socket 17, the lower end of the shank 18b of the ball joint 18 being externally threaded to be received in the upper, internally threaded end 19a of an upper contact carrier housing or plunger holder tube 19. A partition 19b across the tube 19 is also shown internally threaded to receive therein the externally threaded upper end of a plastic or insulative plunger 20. A small bore 21 is provided centrally through the plunger 20 and an insulated conductor 41 is led through a side opening 22 in the carrier end 19a to extend down the bore 21.

An electrical point or contact 23 has cylindrical shank 23a upwardly and a conical point 23b therebelow. The insulative conductor 41 may be electrically connected to the top of the shank 23a, and the shank then press-fitted into the lower end of the small bore 21, the annular surface at the top of the cone 23b thus to bear against the lower end surface of the plastic tube 20 is completed, as the member of the upper contact carrier assembly 24 which carries electrical contact to a contact member of a lower contact carrier assembly to be hereinbelow described.

The metallic tube or body 19 of the upper contact carrier 24 is externally threaded from the lower end upwardly for a substantial length, and a metallic hexagonal nut 25 may be threaded upwardly thereon substantially to the upper end of the external threads. Thereafter, a plastic guide sleeve 26 may be threaded upwardly on the tube 19, following the hex nut 25, to be brought into end face contact therewith, and thereby the guide sleeve 26 is locked to provide an upper carrier stop shoulder 27 upwardly, at a predetermined distance below the trailer bed 15, and for a purpose to be hereinbelow described. Also a cap 28, having a bore 29 therethrough is provided to be threaded upon the upper, externally threaded end 30a of the load indicator tube or housing 30, and the next nut 25 to extend upwardly through the cap bore 29, as shown in FIG. 2.

The lower end of the tube 30 has a closure plate 31 affixed therein, and such plate is bored centrally to receive the externally threaded upper end of the shank 32b of a ball joint 32, the lower end of the ball joint 32 comprising a conventional ball member 32a which is received in a socket 33. The socket 33 is mounted, by machine screws, not shown, on an axle, or on a member designated as a support bar 34 and carried by the axles that support the conventional leaf springs on which the trailer bed is mounted.

Within the overload sensor tube 30 there upstands a tube or spring housing 35 above the closure plate 31, the housing 35 being indicated in FIG. 2 as metallic, and as being welded to the closure plate 31. A spring 36, based upon the closure plate 31, upstands within the housing 35 and bears upwardly against the undersurface of a contact plunger 37, normally to urge it against the top 38 of the housing 35 to shoulder against the underside of such top 38. The plunger or contact member 37 has a shank 37a below the head or top flange 37b thereof, and an insulated conductor or ground wire 39 is electrically connected to the plunger shank 37a and extends outwardly, through a hole or opening 40 in the spring housing 35 and thence through a hole or opening 42 in the overload sensor tube 30, to be grounded.

In case of overload occurring upon the truck trailer bed 12 above any area 15a, 15b carrying an overload sensor assembly 16 thereunder, the conical contact point 23b is urged downwardly to contact, and establish electrical communication with, the contact plunger 37, within the lower contact carrier 43, thus to complete circuit to an indicia location to energize visual and/or audible warning or sensing of the condition of overload.

Referring now to FIG. 7, an overload sensor 16, as hereinabove described, is shown with the insulated conductor circuit 41 between the contact 23 and the positive or side of a BATTERY as indicated by the conventional battery symbol, in full lines. Alternately the conductor circuit 41 is indicated by dotted lines as being connectable to the positive or side of a source of power indicated by an rectangle in dotted lines, this alternative source having OR SOURCE OF POWER printed therein.

A switch 53 is provided in the conductor circuit 41, as indicated in FIG. 7. From the contact plunger 37 an insulated conductor 39 is shown as having a bell or buzzer 49 and an indicating light 51 in series therein, with such conductor 39 extending toward the opposite, negative or − side of the BATTERY OR SOURCE OF POWER. Also it is indicated in dotted lines that a conductor 39a may extend from a point on the conductor 39, adjacent the sensor 16, with parallel lines 39b, 39c, therefrom from the said conductor 39a joined with the aforesaid conductor 39, each with negative or − signs indicative thereof, and extending through a common negative or − conductor to the negative or − side of the battery aforesaid. Also, as an alternative, a conductor is shown extending in dotted lines to the negative or − side of the aforesaid dotted line rectangle indicative of a SOURCE OF POWER. The aforesaid lines 39b, 39c, are indicated in FIG. 7 as having therein, respectively, bell 49a and light 51a, and bell 49b and light 51b.

Illustrative of overload sensor usage in this case, the overload sensor 16 may be installed to indicate overload on a trailer, with the bell 44, light 51, being adjacent the point of overload, or on the trailer; the bell 49a and light 51a in the circuit 39b may be at the tractor or prime mover, while the bell 49b and light 51b in the circuit 39c may be at the terminal office out of which the trailer is loaded. Also, an additional parallel circuit with an overload sensor 16, bell or buzzer 49 and light 51 may be provided, with one overload sensor 16 installed to sense overload at the forward end of the trailer, and the other overload sensor 16 installed to indicate overload at the rear end of the trailer.

Figure 3:
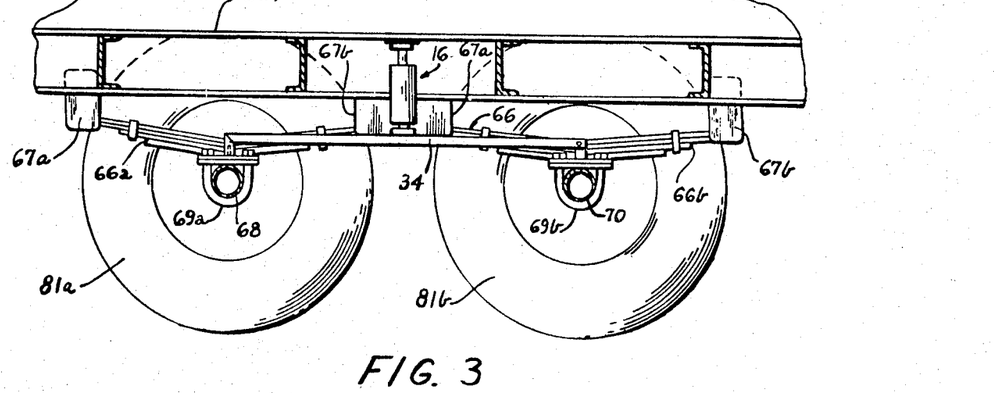
FIG. 3 is a side elevational view, part in section, showing an overload sensor of the type shown in large cross section in FIG. 2, as installed on a trailer, or on a prime mover tandem unit.
Figures 4, 5, 6, 11:
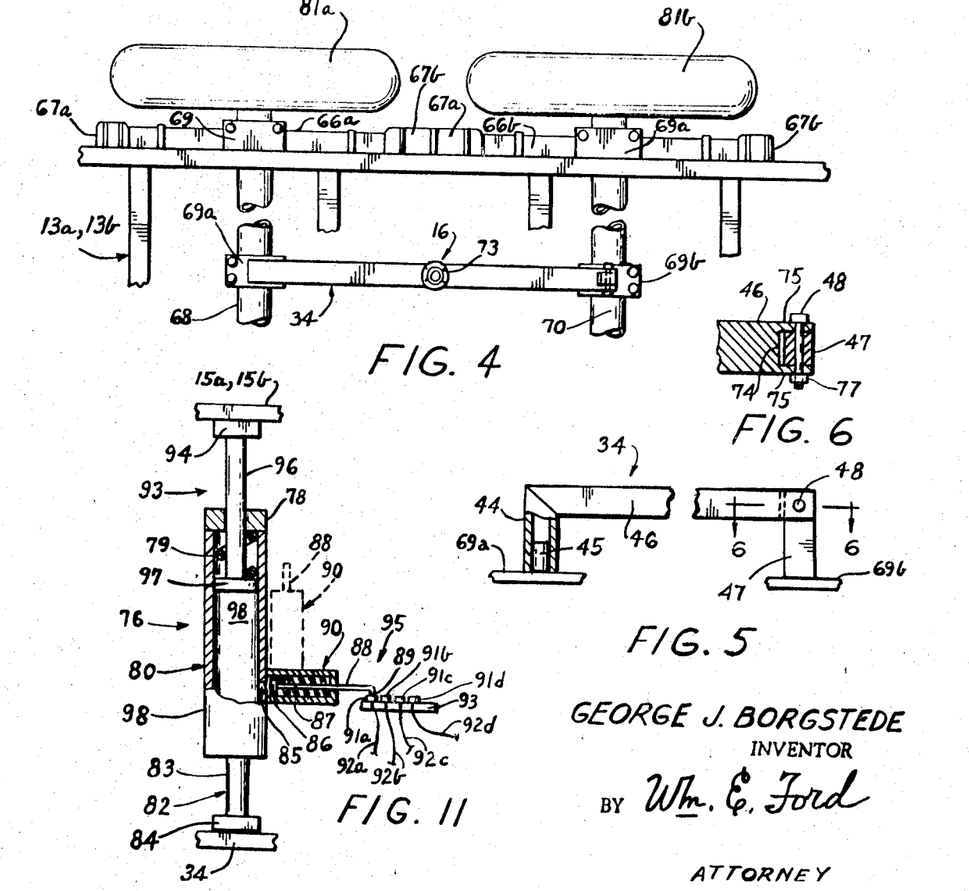
FIG. 4 is a partial plan view with trailer bed or prime mover bed or prime mover bed removed, showing an overload sensor of the type shown in FIG. 2, as centrally disposed upon a support bar between axles of a tandem unit.
FIG. 5 is a side elevational view of the support bar shown in plan view in FIG. 4.
FIG. 6 is a fragmentary plan view, taken along line 6—6 of FIG. 5.
FIG. 11 is a alternative construction of overload sensor comprised of hydraulic cylinders in intersection.

Typical tandem unit construction is shown in FIG. 3 and in FIG. 4 in which a truck or trailer bed portion 15a, 15b received a load thereon, such bed portion being supported by a double leaf spring assembly 66 comprising a forward leaf spring 66a with forward end anchored in a forward hanger 67a and rear end anchored in a rear hanger 67b. The central or lowermost part of the arched leaf spring is connected to the forward axle 68 of the tandem unit by means of a U-bolt clamp 69a, best shown in FIG. 4.

The rearward leaf spring 66b is also shown as having its forward end connected into a forward hanger 67a which abuts the rear hanger 67b for the forward leaf spring 66a, the rear end of the rear leaf spring 66b being connected into the rearward hanger 67b. The hangers 67a, 67b are indicated as conventionally comprising members rigidly connected with the bed or load support thereabove. As in the case of the forward leaf spring 66a, the rear leaf spring 66b is connected centrally at its lowermost parts by a U-bolt clamp 69a to the rear axle 70 of the tandem unit 13a, 13b.

In FIG. 4 the right forward wheel 81a and the right rearward wheel 81b of the tandem unit 13a, 13b may be visualized with the forward wheel 81a supporting the forward axle 68 and the rearward wheel 81b supporting the rearward axle 70. Also in this view, as in FIG. 3, the crossmember or support bar 34 may be seen as extending centrally of the vehicle with forward end connected, as by a U-bolt clamp 63b, to the forward axle 68, and with rearward end connected, as by a similar U-bolt clamp 69b, to the rearward axle 70.

Generally, a trailer 14 of conventional width can be equipped with one forward and one rear overload sensor, and such a pair of sensors can give ample warning of overloading. On the other hand, it may be necessary to employ four overload sensors, one under each corner, with longer and wider trailers.

When the two sensors are to be used, on with each of forward and rearward tandem circuits 13a, 13b, each overload sensor may be disposed centrally upon a support bar 34 which extends along the longitudinal axis of the trailer, one between the forward tandem unit axles 68, 70, and one between the rearward tandem unit axles 68, 70. The sensors 16, as shown in FIG. 2, are connected centrally of the support bar 34 by machine screws, indicated diagrammatically in FIG. 4, as passed through the flange or the socket member 33. Also, the upper socket member 17 has its flange connected by aforesaid machine screws, to a load-supporting trailer bed area 15a, 15b. Optionally, when a truck trailer of a substantially rigidly assembled type is to be used so that upper and lower universal joint connections may not be necessary, connections as shown in FIGS. 8 and 9 may be employed.

Thus, as shown in FIG. 8, the upper end 18c of a rod corresponding in function with the shank 18b in FIG. 2 is connected to a flange 17a, with machine screws 73 being provided to connect the flange 17a to the trailer bed below a load-supporting area 15a, 15b. And, as shown in FIG. 9, the lower end 32c of a rod corresponding in function with the shank 32b in FIG. 2, is connected to a flange 33a, with machine screws 73 being provided to connect the flange 33a to the support bar 34.

In cases where the forward and rear axles 68, 70 of a tandem unit 13a, 13b may tend to spread in service, or in cases where the support bar 34 may be deflected to extend at an angle to the longitudinal axis of travel, it is desirable that the support bar be constructed to accommodate substantially universal motion. Thus, as shown in FIG. 5, a pin 45 is rigidly connected as to the top of a U-bolt clamp 69a on a forward axle 68. Then a member to extend horizontally, as a channel or bar 46, has a short arm or upright 44 attached to extend perpendicularly from its forward end, the upright 44 having a central bore therein to receive the pin 45 with some light clearance.

The rear end of the bar 46 has a slot 74 provided therein to receive the upper end of an upright 47 of rectangular cross section. The base of the upright 47 in turn is connected to the top of a U-bolt clamp 69b on the rear axle 70. The arms 75 of the yoke thus formed when the end of the bar 46 is slotted, are drilled through laterally, as is the upright 47, so that a pivot bolt 48 may be inserted therethrough to pivotally connect the bar 46 to the upright 47. A lockwasher, not shown, and a nut 77 on the threaded end of the bolt 49, may firmly lock the pivot bolt 48 against lateral displacement. Thus the support bar 34 for a load indicator 16 may accommodate any spread or contraction of the distance between the axles 58 and 70. Also, any sway or transverse relative movement of parts with relation to the longitudinal axis of a trailer 14, may be compensated for as the forward upright 44 can swivel about the round pin 45.

A modification of the sensor 16 shown in FIG. 2, is shown in fragmentary, sectional elevation in FIG. 10 in which the degrees or relative amount of overloaded upon a trailer bed area 15a, 15b may be sensed. In such a modification the spring housing 35a for the contractor spring 36, may be of plastic or of any other insulative material. In such an assembly a series of vertically aligned slightly separated, metallic plugs 71a, 71b, 71c and 71d are aligned with the uppermost plug 71a being disposed near the top 38a of the spring housing 35a. In this construction the head or top flange of the contact plunger 37a has a conductor wire 64 peripherally disposed therearound, the plunger 37a also being of metal. Then as the upper contact carrier point 23b is displaced downwardly by overloaded to extend into the plunger housing bore 68a and to establish electrical contact with the contact plunger 37a, the peripheral wire 64 will carry circuit first to sense trough the plug 71a. Then as overload may successively continue the plunger 37a will be successively depressed to carry the peripheral wire 64 successively downwardly to contact successively and sense through plugs 71b, 71c and 71d.

Referring now to FIG. 11, a modification or variation of the sensor 16 is shown in the form of an overload sensor 76. Such sensor comprises a first hydraulic cylinder 80 with the piston rod 96 of its piston 93 having a universal joint socket 94 on the upper end thereof for connection beneath a trailer bed area 15a, 15b. At the opposite end a connecting rod 82 has its upper or shank en 83 connected into the lower end of the first hydraulic cylinder 80 with a universal joint or socket member 84 on the lower end thereof for connection centrally to a support bar 34. A dampener spring 79 is provided within the first cylinder 80 to bear upwardly against the upper end closure 78 and the piston head 97.

A communication port 85 is provided through the sidewall 98 of the first cylinder 80 and a second, smaller cylinder 90 is connected concentrically around the port 85 and rigidly connected to the larger cylinder 80. A piston assembly 95 is provided within the smaller cylinder 90 with the piston head 86 adjacent the port 85 and with the piston rod 88 extending outwardly against the tension of the spring 87 and having an electrical contact point 89 on the outer end thereof.

An insulative support 93 is indicated diagrammatically in FIG. 11 as supporting metallic contact points 91a, 91b, 91c and 91d, to be successively contacted by the piston rod contact end 89 responsive to sense successively increased degrees of overload as may be registered over a trailer bed area 15a, 15b. Conductors 92a, 92b, 92c and 92d extend successively from the respective metallic contacts 91a, 91b, 91c and 91d to a bank of lights for each sensor in various colors and to serve correspondingly as hereinabove described with relation to the elements shown in FIG. 10.

Figure 12:
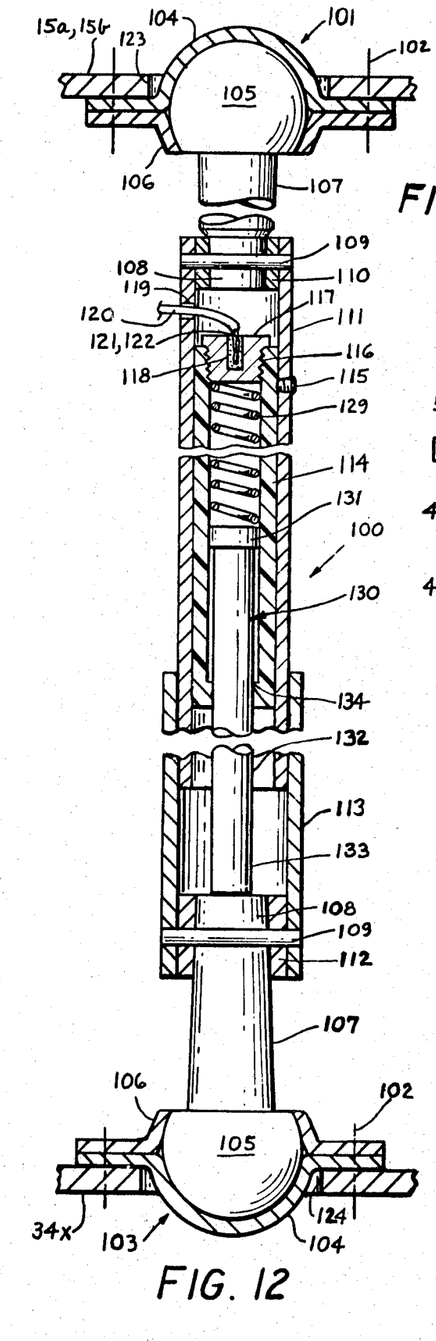
FIG. 12 is an enlarged sectional elevational view, showing an embodiment of the preferred form of the invention.
Figures 13, 17:
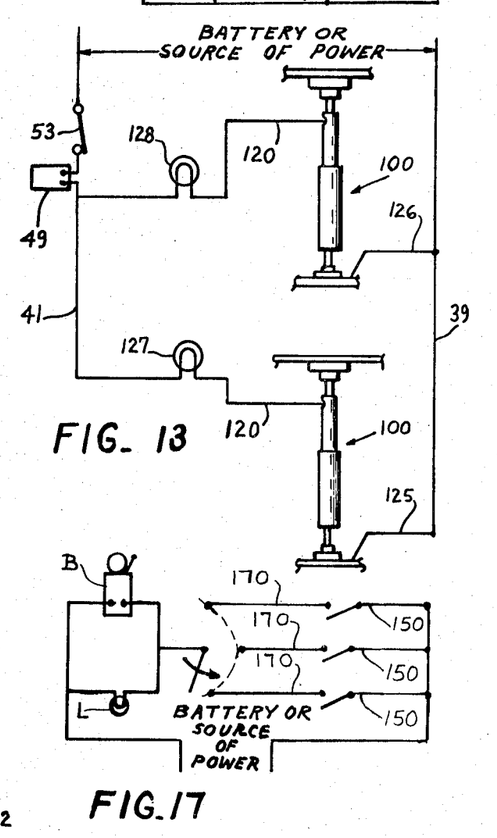
FIG. 13 is an electrical circuit diagram of another arrangement of circuitry and apparatus operable with the apparatus shown in FIG. 2 or in FIG. 12.
FIG. 17 is an electrical diagram indicative of a selector switch which may be manipulated successively to sense for overload at a plurality of overload-sensing stations.

Making reference now to FIGS. 12 and 13, a preferred form of the invention is shown in which an overload sensor 100 has an upper universal joint 101 which is connected, as by bolts and nuts and indicated by dot-dash centerlines 102, to transmit overload impressed upon the forward or rear portion of a trailer bed, as indicated by the reference numerals 15a, 15b. Also, the overload sensor 100 has a lower universal joint 103, indicated by dot-dash centerlines 102 as connected to a lower overload sensor support member 34x which in turn is supported by an axle. Each universal joint 101, 103 includes a hemispherical base member 104, a ball member 105, and a hold-on or cap member 106 with a shank 107 extending therefrom.

The upper universal or ball and socket member 101 has the lower end 108 of its shank 107 connected, by a pin 109 therethrough an outwardly thereof through a bushing 110, to the upper end of an upper load transmitting and contact carrying, tubular member 111, into the upper end of which the bushing 110 is received. The lower universal or ball and socket member 103 has the upper end 108 of its shank 107 connected, by a pin 109 passed therethrough and outwardly thereof through a bushing 112, to the lower end of a lower load-transmitting and contact-carrying, tubular member 113, into the lower end of which the bushing 112 is received, and into the upper portion of which the lower portion of the upper tubular member 111 telescopes.

An insulative cup or tubular sleeve 114 is adjustably disposed within the upper tubular member 111 and is affixed at selectively spaced points in relative elevation therewithin by means of a setscrew 115, or by setscrews in plurality. The upper end of the sleeve 114 is internally threaded with threads 116 to threadably receive an externally threaded contact carrier plug 117 to which the live or current carrying wire 121, 122, from the vehicle battery, or other source of power, is electrically connected.

The sensor upper tubular member 111 has a bore 119 through the wall thereof through which the insulated electrical conductor cored 120, carrying the live conductor wire 121, 122 extends to circuitry connecting it to a battery or other source of power. A bore 123 is provided upwardly, as in the forward trailer end, or the vehicle bed, or both, indicated by reference numerals 15a, 15b, in FIG. 12 to receive the base hemispherical or socket member 104 upwardly therethrough. Also, a bore 124 is provided in the lower overload sensor support member 34x to receive the base hemispherical or socket member 104 downwardly therethrough.

The circuitry shown in FIG. 13 is essentially comparable to that shown in FIG. 7 except that both a rear sensor 100 and a forward sensor 100 are shown in parallel circuits 120, 125, and 120, 126, respectively, with respective rearward and forward sensing lights 127, 128 in such circuits disposed in the proximity of the respective sensors, to sense overload more graphically in relation to points of overload. Otherwise, the circuitry is substantially in correspondence with the circuitry of FIG. 7, but audible signal warning 49 is indicated in circuit with the switch 53 and thus common to audibly sense overload at either sensor 100.

In operation, before overload occurs, a spring 129, confined upwardly by the carrier plug 117, bears downwardly upon the head 131 of a contact plunger 130 whose shank 132 initially terminates with lower or contact end 133 thereof being spaced above the upper end 108 of the lower shank 107. The plunger head 131 shoulders at 134 upon the base of the closure end of the cup-type sleeve 114, as urged downwardly by the spring 129.

Then, as overload telescopes the upper, contact carrying tubular member 111 into the upper portion of the lower, contact carrying member 113, the lower shank end 133 of the plunger 130 contacts the upper face of the universal ball shank end 108 which comprises the ground connection circuit 125, 126. Thus visual indicia is flashed or sensed by the light 127, 128 adjacent the sensor 100 which senses overload, also audible indicia 49 sounds, whichever sensor 100 may be receiving overload thereon. Also, as overload increases, the upper contact carrying member 111 is urged further downwardly into the lower contact carrying member 111, so that the plunger 130 stands as in FIG. 12, with its head 131 compressing the spring 129. Obviously, calibration can thus be carried out with the structure hereinabove described, simply by changing the elevation of the sleeve 114 with relation to the setscrew 115.

In this form of the invention there is such universality of connection, upwardly and downwardly, by the provision of the strongest type of universal joints, that any possibility of breakage, as between welded parts, is substantially minimized. Thus any stresses and strains otherwise being possible with the leaf spring axis being spaced from, and parallel to, rather than coaxially with, sensor axis, are reduced to a minimum, primarily due to the fact that these potentialities are substantially neutralized by the universal joints 101, 103.

Figure 14:
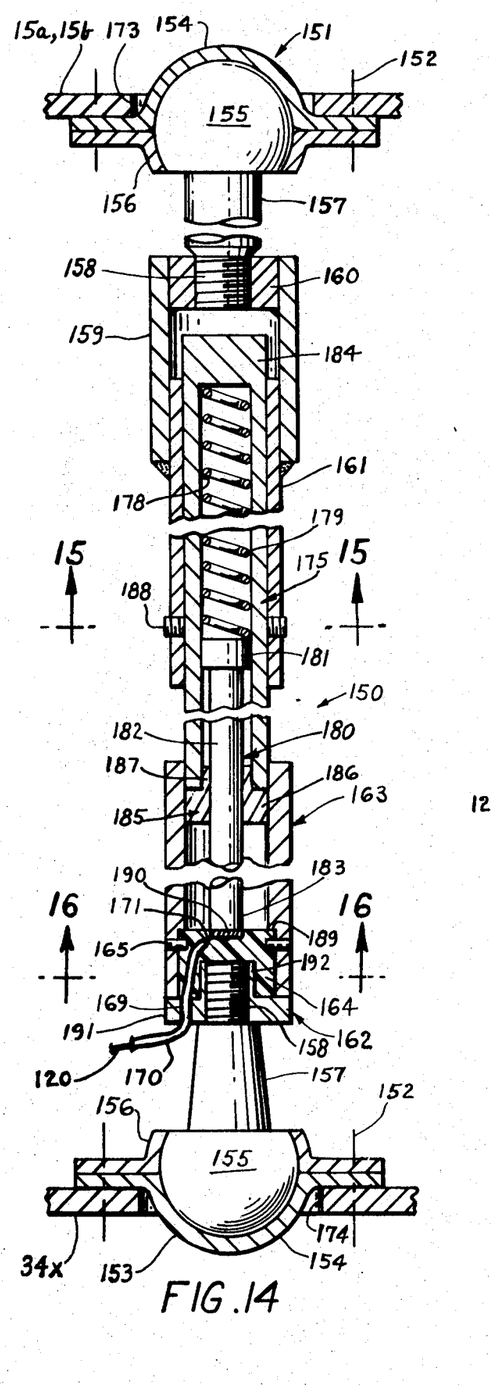
FIG. 14 is an enlarged sectional elevational view, showing another embodiment of the preferred form of the invention, in which easy, ready and accurate calibration may be effected by the simple adjustment of the position of a contact carrying sleeve with relation to a load moveable part.
Figure 15:
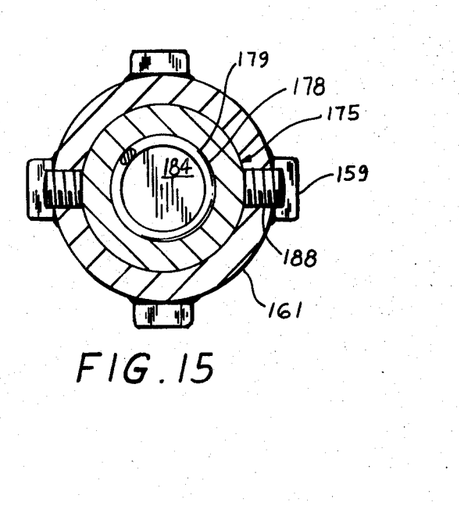
FIG. 15 is a sectional bottom view, taken along line 15—15 of FIG. 14.
Figure 16:
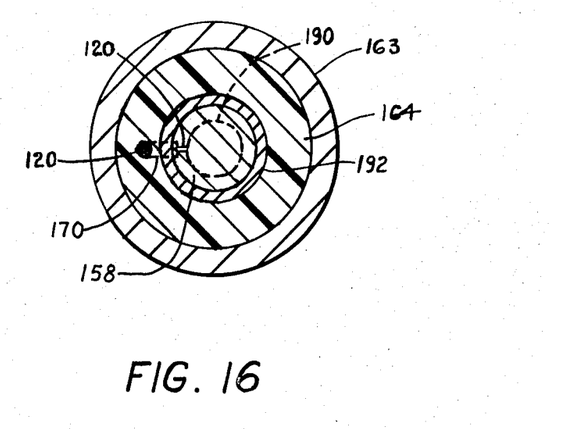
FIG. 16 is a sectional bottom view, taken along line 16—16 of FIG. 14.

Referring now to the overload sensor shown in FIGS. 14–16, an overload sensor 150 has an upper universal joint 151 connected, by bolts and nuts, indicated by centerlines 152, to the under side of a trailer bed forward portion indicated by reference numeral 15a, and rear portion indicated by reference numeral 15b. Similarly, the overload sensor 150 has a lower universal joint 153 connected by bolts and nuts, indicated by centerlines 152, to an overloaded sensor support member 34x, which is in turn supported by an axle. The ball member 155 of each universal joint 151, 153, fits within its base member 154, and each respective universal joint 151, 153, is completed by its hold-on-cap member 156 in which is received the outer part of the ball member 155 from which extends the shank 157 with its reduced diameter, externally threaded end part 158.

The upper overload sensor tubular member 159 has axially extending connection bars 161 equally angularly spaced apart therearound for upper connection to a bushing 169 which is internally threaded to receive the shank end 158 of the upper universal joint 151, whereby the overload sensor 150 is universally connected upwardly to the underside of a load-carrying trailer, tractor, or to a load-carrying part of may other carrier needing an overload sensor.

The upper sensor tubular member 159 has insertable thereinto the sleeve 175 which has a closed upper end 184 and which is bored from the lower end to provide the bore 178 into which is received a spring 179. Also, below the spring 179, the head 181 of a plunger 180 is inserted into the bore 178. The plunger shank 182 is received through a bottom closure flange 185, the body 187 of the flange 185 being of reduced diameter to fit within the lower end of the sleeve 175, while the upper surface of the head 186 of the flange 185 seats upon the sleeve lower end surface.

The sleeve 175 is adjustably positioned within the upper sensor tubular member 159 by means of setscrews 188 passed threadably through such tubular member 159 to bear against the sleeve 175 when it has been slid a predetermined distance of calibration within the upper end of the lower sensor tubular member 163. Such tubular member 163 has a counterbore 189 in its lower end to receive a plastic or insulative bushing 184 therein which carries a metallic contact point or disc 190 centrally in the top thereof. A conductor wire 120 is connected to the contact point or button 190 and extends within an insulative sheath 170 which is embedded within, or passes through the bushing 184 and out through a hole 169 in the flange member 191 of a closure flange 162 with an upper end 192 which extends upwardly into a recess in, or is embedded in the plastic bushing 184. From the lower sensor closure flange 162 the insulative conductor 170, with wire 120 therein, extends outwardly for connection to the positive side of a source of electrical power.

The lower universal joint 153 has a shank 157 that extends upwardly from the ball member 155 which has a reduced diameter, externally threaded upper end 158, onto which is threaded the closure flange 162 of the lower indicator 163. Thus the lower part of the overload sensor 150 has a universal joint connection to axle supported means comparably as the upper part of the overload sensor 150 is connected by a universal joint connection to the underside of a load-carrying area.

The overload or overload sensors 150, or 30 may be electrically connected in typical electrical wiring diagrams. In the diagram of FIG. 17, three switches 150 (100 or 30) are shown with grounds, or right-side conductors from a source of electrical power, as a battery. From the left side of the switches 150 insulated conductors 170, (as indicated in FIG. 14), extend for their conductor wires to be connected to the three selective terminals of a multiple terminal switch of the rotary type. The three switches 170 may be located, as, for instance, to sense overload on a first tractor, to sense overload on a second tractor or on the forward end of a trailer, and to sense overload on a trailer, or on the rear portion thereof. In this case the switch arm is turned successively to the terminals of the conductors 170 from the respective overload sensor switch locations 150, the closure of an overload sensor switch 150 being sensed by signal, as from the light L or the bell or buzzer B, in circuit with the rotary switch.

Figure 18:
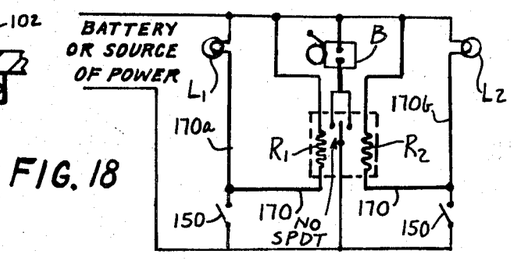
FIG. 18 is an electrical diagram of an arrangement by which the occurrence of overload at a location closes circuit to a light indicative of overload an also energizes a relay to close a normally open, single-pole, multiple-throw switch to ring an audible signal, thus sensing or directing attention to look for overload where respective turned on light indicates.

As shown in FIG. 18, two overload sensor switches 150, located under predetermined load-carrying areas, are shown in parallel circuits 170 which include therein respective relays $R_1$, $R_2$. Also, circuits 170a, including the flashing or warning lights $L_1$, $L_2$ are shown in parallel with the respective relays $R_1$, $R_2$. A switch, designated by NOSPDT, as a normally open, single-pole, double-throw switch, is disposed between the relays $R_1$, $R_2$, so that the switching arm may be switched to one side or the other, as the respective relays are energized. As respective overload sensor switches 150 close circuit, a respective light $L_1$, $L_2$ has circuit closed therethrough by a respective relay $R_1$, $R_2$ throwing the switch arm. Thus, the occurrence of overload is sensed audibly, and the location of overload is sensed visually, as by color of light flash.

In the form of invention shown in FIGS. 14–16 the lower end of the plunger shank 183 is spaced above contact button 190 in the member 163, a predetermined distance equal to the down travel of the member 159 from a no-load to overload position, the head 181 of the plunger 180 being seated on the top or body portion 187 of the sleeve closure flange 185. Then, after the upper member 159 moves downwardly from no-load to overload position, as the sleeve 175 is disposed therein by the setscrews 188 in precalibrated position, the bottom of the plunger shank 183 closes contact with the button or disc 190 at the first point of overload. Then, as overload progresses, the sleeve 175 is moved further downwardly into the lower tubular member 163 while the plunger head 181 compresses the spring 179 within the sleeve bore 178, as indicated in FIG. 14. This form of the invention thus provides a most readily and easily calibrated combination of structures, with the action taking place to close contact by relative in-line, slidable movement between upper and lower sensor elements.

Figures 19, 21, 22, 23:
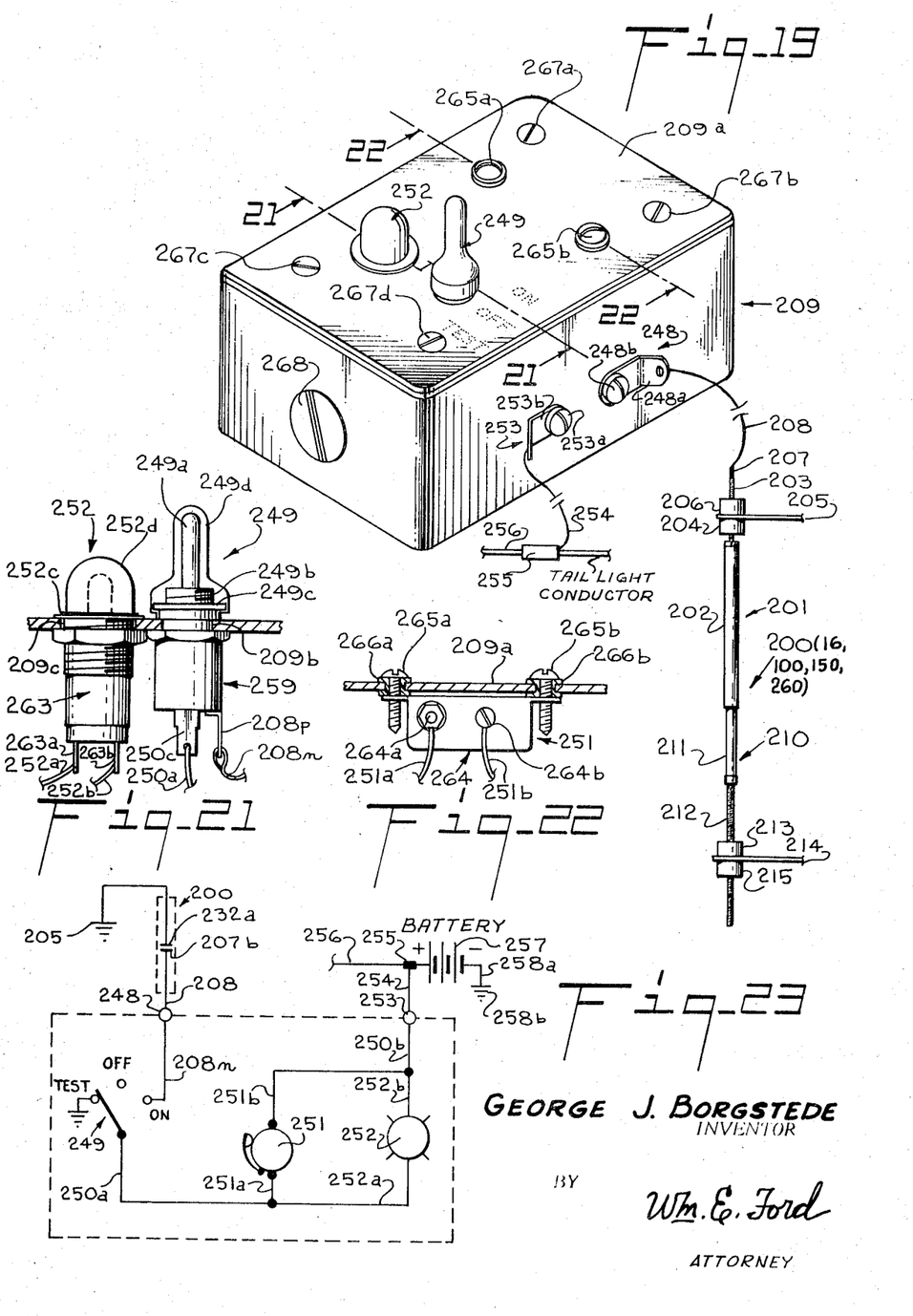
FIG. 19 is a development view, at least partially isometric, showing a small-scale preferred embodiment of the preferred form of overload sensor, the control panel reflective of the operation of such load indicator, and positive conductor means to the panel.
FIG. 21 is a transverse elevational view, part in section, taken along line 21—21 through the panel shown in FIG. 19, showing light and switch.
FIG. 22 is a transverse elevational view, part in section taken along line 22—22 through the panel shown in FIG. 19, showing end view of buzzer.
FIG. 23 is a wiring diagram of the apparatus shown in FIG. 19, with panel apparatus indicated within a dotted line rectangle.

Referring now to the overload sensor shown in FIGS. 19, 19A, 19B and 19C, which comprises a favored structure, an overload sensor 200 is shown to small scale in FIG. 19 as comprising a first or upper contact carrier 201 including an upper tubular member 202 with an upper threaded rod 203 extending upwardly therefrom through an underside upper rubber bushing 204, and then through the load-supporting area or load bed, or through a bracket 205 extending therefrom. Above the bracket 205 the rod 203 extends through a top side, upper rubber bushing 206, and thereabove. The bushings 204, 206, are resilient, deformable and/or compressible. The upper end of an upper contact 207 is shown extending above the upper end of the threaded rod 203, and a "hotline" or positive insulated conductor 208 extends from the contact 207 for connection into a panel box 209, as will be described in detail hereinbelow.

A lower contact carrier 210 is shown as including a lower tubular member 211 which is indicated as intertelescoping upwardly into the upper tubular member 202, with a lower threaded rod 212 being indicated as extending downwardly from the lower tubular member 211 to pass through a top side lower rubber bushing 213, a bracket 214, supported above the vehicle axle means which supports the conventional leaf springs that support the load bed or load-supporting area. Below the bracket 214 the lower threaded rod 212 passes through an underside lower rubber bushing 215 to terminate therebelow.

Figure 19A:
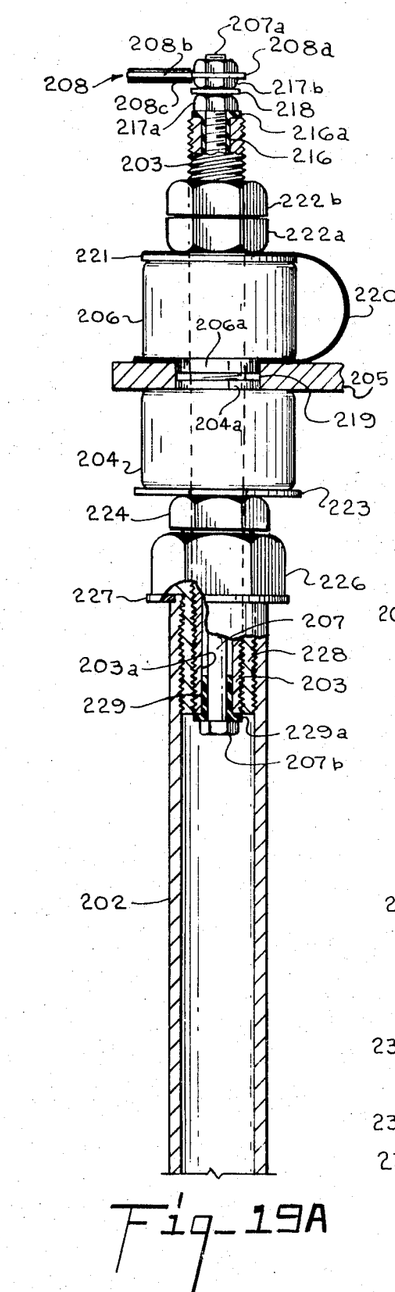
FIGS. 19A, 19B and 19C are larger scale, fragmentary, elevational views, part in section showing, respectively, the upper, central and lower portions of the load indicator shown to smaller scale in FIG. 19.
Figures 19B, 19C:
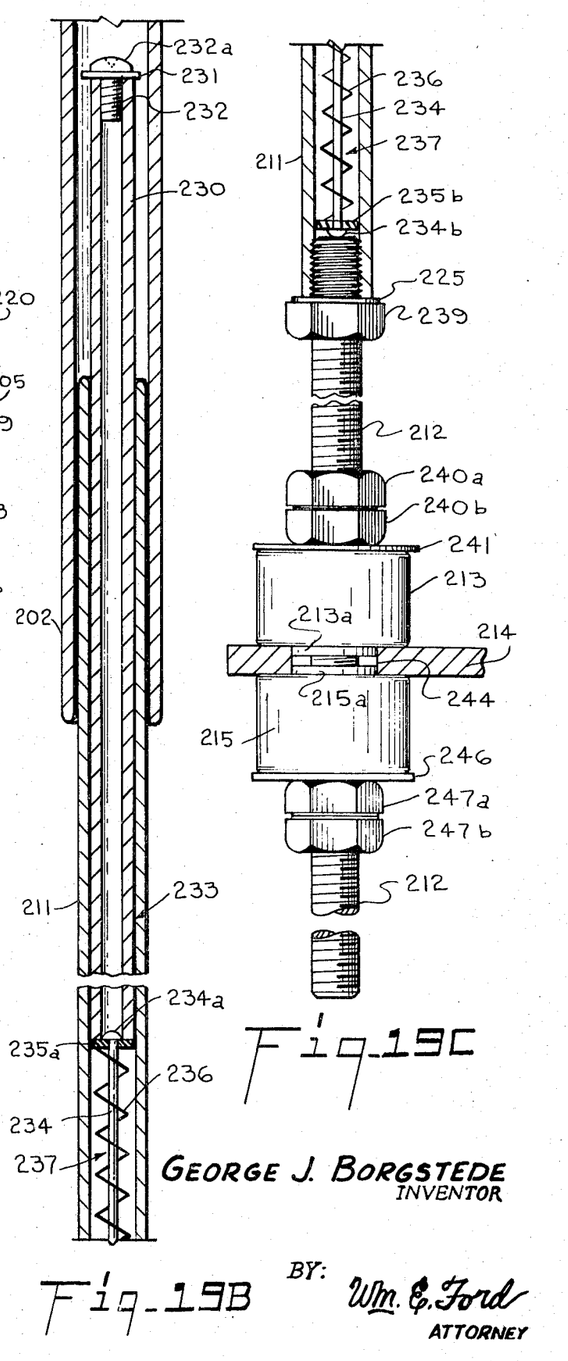

The overload senor 200 is shown in greater detail in the larger scale views of FIGS. 19A, 19B, and 19C, and thus it can be seen that he upper threaded rod 203 had press fitted into the upper end of its smooth hollow bore 203a, an upper tubular rubber or neoprene insulative bushing 216 which has a flange 216a on the upper end thereof to cover and insulate the upper end face of the upper threaded rod 203.

Thus the upper, threaded end 207a of a bolt 207, which comprises the aforesaid upper contact of the sensor, is shown extending upwardly through the insulative bushing 216, with a locating nut 217a being threaded upon the bolt upper end 207a to bear upon the insulative flange 216a of the insulative bushing 216. A washer 218 is shown about the bolt end 207a to seat upon the locating nut 217a, and a second nut 217b is threaded onto the rod end 207a, face upwardly, to bear upon the washer 218 and act as a locknut for the locating nut 217a. Then the conductive plate or bored tab end 208a of the hotline 208b, is fitted over the threaded end 207a of the contact or contact bolt 207, tightly, to carry current therefrom, and from the tab 208a the hotline 208b extends within insulation 208c, as the "hotline" or positive insulated conductor cord 208, for connection to the panel box 209, FIG. 19, as aforesaid.

A conventional metallic ground strap 220 has had the upper threaded rod 203 passed with clearance through the lower part thereof before the top side upper insulative bushing 206 has been installed, and the arched strap 220 has had its bored upper end pressed over the upper end of the threaded rod 203, so that the upper part thereof bears upon a metallic washer 221 on top of the top side upper insulative bushing 206. Optionally the ground strap lower end may be welded or otherwise affixed to the top surface of the bracket 205, or to the metallic load-supporting area or metallic vehicle bed. Above the upper part of the metallic ground strap 220 a locating nut 22a is shown threaded, face upwardly, upon the upper threaded rod 203 to bear upon the said metallic washer 221, and in turn a corresponding nut 222b is shown threaded, face downwardly, upon the upper end of the threaded rod 203 to bear face to face upon the locating nut 222a and serve as a locknut.

Noticeably the upper underside and top side rubber bushings 204, 206, have reduced diameter portions 204a, 206a, which may be press fitted, respectively, downwardly and upwardly into a bore 219. This bore 219 through the load bed, or through the bracket 205 extending therefrom, is some bit larger than the diameter of the upper threaded rod 203 that passes therethrough. Then, since the reduced diameter portions 204a, 206a, of the respective rubber bushings 204, 206, are press fitted into the bore 219, and leave space therebetween as they receive the upper threaded rod 203 therethrough, the rod 203 may be said to be connected to the bracket 205, (or load bed), by a substantially universal connection. This connection amounts in function to an universal joint connection for the amount of sideway or roll, pitch or longitudinal deflection, and vibration or vertical undulation that may be encountered between the upper and lower sensor connections or anchorages.

Continuing in detail, the underside upper rubber bushing 204 seats upon a metallic washer 223 around the threaded rod 203, which in turn seats upon a nut 224, that serves as an assembly nut above the head of an adapter nut 226 to be described in further detail immediately hereinbelow. The externally and internally threaded shank 228 of the adapter nut 226 has received the lower end portion of the threaded rod 203 therethrough, the head of the adapter nut 226 bearing upwardly in locknut relationship with the face of the aforesaid assembly nut 224 for the assembled elements thereabove. The upper end 202a of the upper tubular member 202 is of reduced diameter to provide outwardly thereof a shoulder 202b upon which seats a metallic washer 227 to bear against the undersurface of the head of the adapter nut 226.

An insulative tubular bushing 229, as of neoprene, is press fitted into the lower end of the smooth hollow bore 203a through the threaded rod 203, with a flange 229a on the lower end of the neoprene bushing 229 to bear insulatively upon the lower end face of the threaded rod 203, while therebelow the head 207b of the contact bolt 207, (which comprises the contact button), bears upwardly on the insulative flange 229a.

Now considering FIG. 19B, the lower tubular member 211 is shown intertelescoped upwardly into the upper tubular member 202, with such lower tubular member 211 comprising part of the lower contact carrier 210, and having intertelescoped upwardly thereinto, in turn, a contact tube 230 having a washer 231 seated on top thereof with a machine screw 232 threaded downwardly into the upper end of the contact tube 230, with head 232a comprising the contact button of the lower contact assembly 233. At its lower end the contact tube 230 seats upon a brass washer 235a. A contact rod 234 extends through an upper brass washer 235a, a compression spring 236, and a lower brass washer 236a, the upper end of the spring 236 being affixed to the underface of the upper brass washer 235a, and the lower end of the spring 236 being affixed to the upper face of the lower brass washer 235b. Now refer also to FIG. 19c. An upper head 234a on the upper end of the contact rod 234 bears upon the upper face of the upper brass washer 235a, and a lower head 234b on the lower end of the contact rod 234 bears upwardly against the underface of the lower brass washer 235b. At least one of the heads 234a, 234b, is swaged or formed as a last step to complete the contact rod and spring assembly 237.

The lower head 234b of the contact rod 234 is shown in FIG. 19c as resting on the upper end face of a lower threaded rod 212, with the lower end face of the lower tubular member 211 resting upon a washer 225 upon the upper face of a locating nut 239 that has been threaded, face upwardly, upon the upper end of the lower threaded rod 212 for a predetermined distance in calibration. Centrally upon the lower threaded rod 212 a succession of elements are shown installed. First a locknut 240a with face lowermost to bear on a locating nut 240b with face uppermost. Then a metallic washer 241 on which bears the locating nut 240b.

Then a top side lower rubber insulator or bushing 242, on which seats the metallic washer 241, is shown, the insulative bushing 242 in turn seating on the upper surface of a bracket or element 243, which is in turn supported above the conventional vehicle axle, not shown. Such axle, as aforesaid, supports the conventional leaf spring assembly which in turn supports the load-supporting area or vehicle bed, (or the bracket 205 which extends therefrom), as shown in FIGS. 19A and 19. A reduced diameter portion 242a of the insulative bushing 242, in shown press fitted into a bore 244 provided through the bracket 243. Also, a correspondingly sized and shaped underside lower rubber insulator or bushing 245 is shown installed about the lower threaded rod 238 to bear upwardly against the underface of the bracket 243, the bushing 245 having a reduced diameter portion 245a to be press fitted into the lower portion of the aforesaid bore 244, to an elevation spaced below the lower face of the corresponding portion 242a of the top side lower rubber insulator or bushing 242.

The lower face of the aforesaid insulative bushing 245 seats upon a metallic washer 246 which in turn seats upon the top of a locating nut 247a, with a locknut 247b having been threaded, face upwardly, to bear against, and lock with, the face of the aforesaid locating nut 247a. By the hereinabove described construction, it may be seen that the respective top side and underside insulative rubber bushings 242, 245, together cooperate and substantially universally connect the lower threaded rod 212 of the lower contact carrier assembly 210, to the bracket 243. The rubber being deformable and/or compressible, within limits, allows universal compensation for the sensor in sidesway or lunge.

The lower tubular member 211 fit slidably within the upper tubular member 202 with such tolerance as to carry current between these members. Thus, when a load or overload on the load-supporting area causing downward movement of this area or load bed (or of the bracket 205 associated therewith, to compress the conventional leaf spring assembly that is supported upon the vehicle axle means therebelow, the upper tubular member 202, comprised in the upper contact carrier 201, slide downwardly upon the lower tubular member 211, comprised in the lower contact carrier 210. The upper contact or bolt 207, including its head 207b on its lower end, comprising the upper contact button, being insulatively connected within the tubular member 202, accordingly moves downwardly therewith, a distance calibrated to correspond with a predetermined weight placed upon the load-supporting area, as a weight amounting to that weight which just begins amounting to overload. At this point the upper contact button 207b contacts the machine screwhead 232a, comprising the lower contact button, at the top of the contact tube 230.

Current is thus carried toward ground by way of the contact tube 230, comprised in the lower contact assembly 233, to the upper brass washer 235a, and thence through the hereinabove described spring and rod assembly 237, via the lower rod head 234b to the lower threaded rod 212, to which the lower end of the lower tubular member 211 is connected, whereby the lower tubular member 211 upstands thereabove to carry current back upwardly, by virtue of sliding contact of the lower tubular member 211 with the upper tubular member 202. Also, the lower brass washer 235b may fit with such slight tolerance within the lower tubular member 211 that current is carried directly across to such said lower contact carrier member 211.

At this point it is pointed out again that the lower threaded rod 212 is designedly and studiedly insulated from the axle means supported bracket 243, since in cases it has been found that good ground connections cannot always assuredly be maintained through this chain of elements. Thus, from the lower tubular member 211 the electrical path to ground extends slidably across to the upper tubular member 202, and thence by way of the upper threaded rod 203 to the metallic washer 221 upon which seats the upper portion of the ground strap 220. Thence from the ground strap 220 to the metallic load-supporting area or bed, as by way of a bracket 205 associated therewith.

Consideration may be given the feature whereby as overload may continue to be increased after contact has first been made between the upper contact button or bolthead 207b an the lower contact button or machine screwhead 207b, further downward movement of the load bed or load-supporting area, urges the contact tube 230 downwardly to compress the spring 236. Thus, the spring 236 buffs against overtravel, with the spring 236 being preselected of such size, length and annealing that it will not be fully compressed or broken by the greatest overload weight within practical contemplation having been placed on the load-supporting area or load bed.

Referring now to FIGS. 19 and 21, 22, and 23, the positive insulated conductor cord 208 is shown extending to the aforesaid panel box 209, where connection is made with a current carrying conductor 208m, within the panel box 209, by means of a connection post 248, comprised of a connection lug or angle 248a and a connection screw 248b which connects the lug 248a to the panel box 209, and which extends inwardly thereinto, as for connection with the conductor 208m. Inside the panel box 209 the conductor 208m connects to the ON-terminal of a three-position switch 249. When the sensor 200 is not in use, the switch 249 stands erect, or extends normally from the panel box cover or lid 209a, as indicated in FIG. 19, or is disposed in OFF-post contact, in the diagram of FIG. 23. When the sensor 200 is in use the switch 249 closes circuit between the aforesaid conductor 208m and a conductor 250a which divides, within the panel box 209 into two parallel-extending circuits 251a, 251b, and 252a, 252b, having respectively therein a conventional buzzer 251 and light 252, as shown in FIG. 23.

Such circuits are joined into a conductor 250b which extends to the inner end of a connection screw 253b, which comprises, with the connection lug or angle 253a, a connection post 253, FIG. 19. From the lug 253b, FIG. 19, a conductor 254 extends to be spliced by means of a connection sleeve 255 into a conductor 256 from the positive terminal, say of the conventional vehicle storage battery 257, FIG. 23, the negative terminal of the storage battery 257 being indicated diagrammatically as connected by a negative side conductor or connection 258a to a ground 258b. The conductor 256, into which the conductor 254 is spliced, may be the conductor to any conventional auxiliary feature of the vehicle, as, for instance, the taillight.

Now considering FIGS. 21 and 23 in relation to FIG. 19, the switch 249 is a conventional three-position switch which normally may stand open, (in OFF-position in FIG. 23) so that the switch handle 249a stands vertically out from, or normal to, the surface of the panel box lid or cover 209a. The switch handle or lever 249a is shown upstanding centrally from an externally threaded bushing 249b, with the bushing in turn being shown upstanding from a switch journal, rubber or resilient plastic 249c, which extends through a bore 209b in the panel box cover plate 209a, for connection into the switch contact housing 259 therebelow. The moving of the switch lever 249a to ON-position switches the lower end of the lever 249a, below its pivot in the switch contact housing 259, to close contact therewithin, between the conductor 208n and the conductor 250a, these conductors being indicated in FIG. 21 as extending from respective depending connection lugs 208p and 250c. The lever 249a and the upper part of the switch journal 249c are shown covered, preferably by a light, transparent plastic jacket 249d.

In adjacency with the switch 249, a light fixture 252c is shown extending from the light dome or globe 252d thereabove, through a bore 209c in the panel box cover 249a, to connect with a light plug 263 therebelow. The depending lugs 263a, 263b are for the purpose of establishing electrical contact with the respective conductors 252a, 252b, shown in the electrical diagram of FIG. 23. In further explanation of FIG. 21, the switch lever 249a may be turned to the TEST position, as indicated on the panel box cover 209a, or in the electrical diagram, FIG. 23, thus to close circuit through the buzzer 251 and light 252, to ascertain their operability, before shifting to ON-position.

No connection lug is indicated from the switch contact housing to a ground, but assumption can be made that such a ground connection may take place through the housing 259, per se. The buzzer 251 has its frame 264 connected to the underside of the panel box cover 209a by means of screws 265a, 265b, passed through insulative jackets 266a, 266b fitted through aligned holes spaced apart transversely across the housing FIGS. 19 and 22. The conductor 251a is indicated as being connected to the negative side of the buzzer 252 by means of the bolt 264a, and the conductor 252b is indicated as being connected to the positive side of the buzzer 252 by means of the screw 264b.

In assembly, it is best indicated in FIG. 19 that the lid or cover 209a is assembled with the panel box 209 by machine screws 267a, 267b, 267c and 267d disposed near the respective corners of the panel box. Also these machine screws 267a, 267b, 267c and 267d may be of length to extend further, and through the panel box 209, to connect it to a structure on which the panel board 209 is to be mounted, as on the dashboard of a vehicle. Also note the large assembly screw 268 in the near end of the panel box, FIG. 19, which designates that a large flathead-type screw is employed in assembly of the panel box 209, as upon an aforesaid dashboard. The means effecting assembly, as lugs and bosses that extend within the interior of the panel box, being conventional, are not shown.

Referring now to the form of invention shown in FIGS. 20, 20A and 20B, this form is in such correspondence as to practically all elements shown in the form of invention shown in FIGS. 19, 19A, 19B and 19C, that corresponding elements are assigned like reference numerals in the various views, with only those elements comprising different structural shapes being designated by different reference numerals than in the aforesaid views, hereinabove described. In effect this form differs from the aforesaid form immediately hereinabove described only in that the lower threaded rod of its lower contact carrier grounds with vehicle axle supported means, and only in that that there is difference in degree in the manner of effecting upper and lower universal connection of sensor to respective load bed, or bracket extending therefrom, and to bracket supported above the vehicle axle means.

Figures 20, 20A:
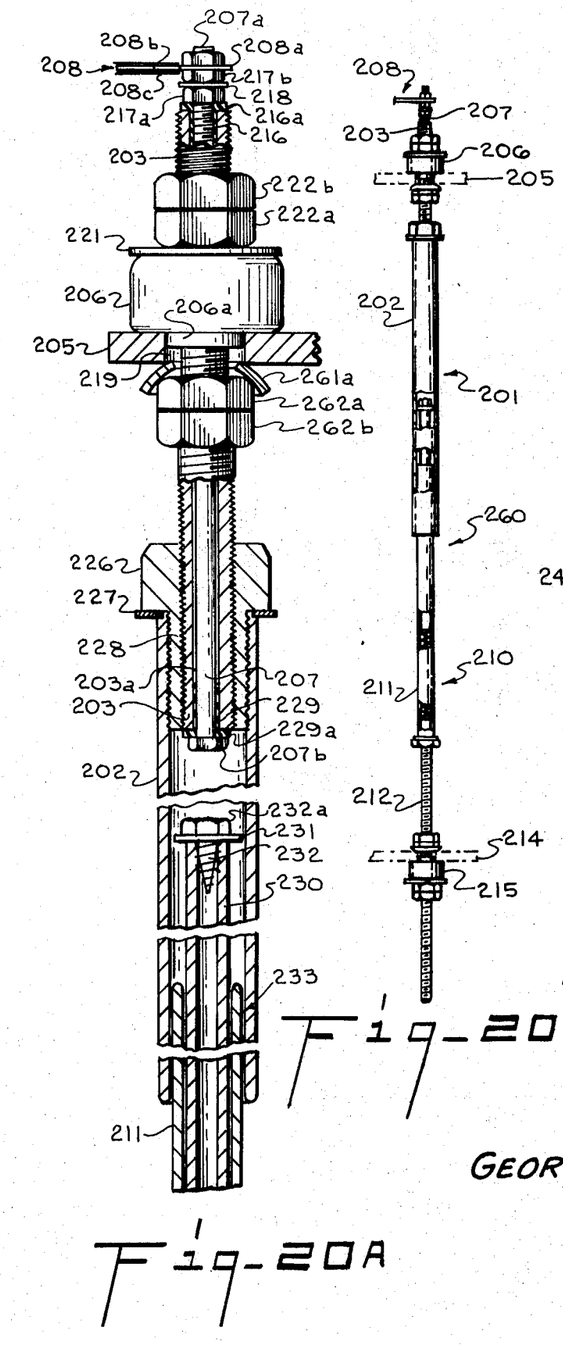
FIG. 20 is a small-scale, elevational view, part in section, of another embodiment of the preferred form of overload sensor.
FIGS. 20A and 20B are larger scale, fragmentary elevational views, part in section, of the respective upper and lower portions of the overload sensor shown to smaller scale in FIG. 20.
Figure 20B:
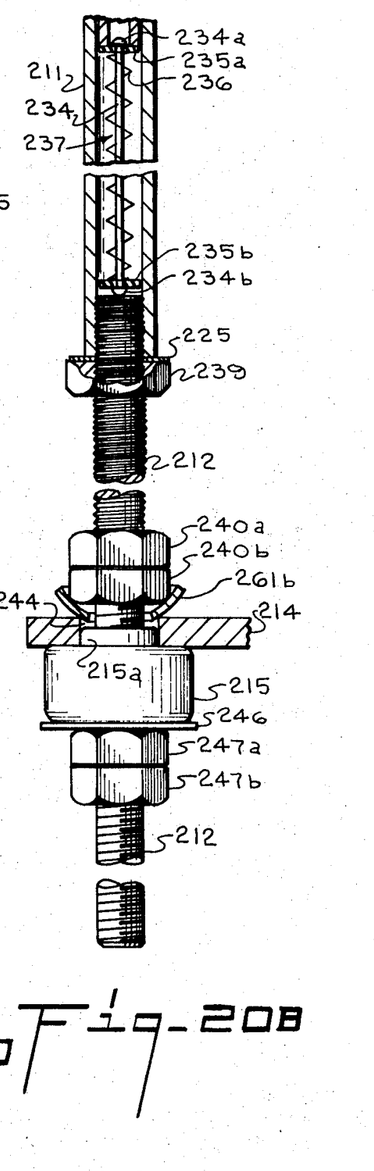

Thus the form of sensor 260 shown in FIGS. 20, 20A and 20B, is shown in small scale in FIG. 20 as comprising a first or upper threaded rod 203 extending upwardly therefrom through a washer shaped as a spherical shell segment 261a, and then through the load-supporting area or load bed, or through a bracket 205 extending therefrom. Above the bracket 205 the rod 203 extends through an upper rubber bushing 206. Such bushing 206 is resilient, deformable and/or compressible. The upper end of an upper contact 207 is shown extending above the upper end of the threaded rod 203, and a "hotline" or positive insulated conductor 208 extends from the contact 207 for connection into a panel box 209, as to the panel box 209 shown in FIGS. 19, 21, 22 and 23.

A lower contact carrier 210 is shown as including a lower tubular member 211 which is indicated as intertelescoping upwardly into the upper tubular member 202, with a lower threaded rod 212 being indicated as extending downwardly from the lower tubular member 211 to pass through a washer shaped as a spherical shell segment 261b, a bracket 214, supported above the vehicle axle means which supports the conventional leaf springs that support the load bed or load-supporting area. Below the bracket 214 the lower threaded rod 212 passes through an underside lower rubber bushing 215 to terminate therebelow.

The overload sensor 260 is shown in greater detail in the larger scale views of FIGS. 20A and 20B, and thus it can be seen that the upper threaded rod 203 has press fitted into the upper end of the smooth hollow bore 203a therethrough, an upper tubular rubber or neoprene insulative tubular bushing 216 which has a flange 216a on the upper end thereof to cover and insulate the upper end face of the upper threaded rod 203.

Thus the upper, threaded end 207 a of a bolt 207, which comprises aforesaid upper contact of the sensor, is shown extending upwardly through the insulative bushing 216, with a locating nut 217a being threaded upon the bolt upper end 207 a to bear upon the insulative flange 216a of the insulative bushing 216. A washer 218 is shown about the bolt end 207a to seat upon the locating nut 219a, and a second nut 217b is threaded onto the rod end 217a, face upwardly, to bear upon the washer 218 and act as a locknut for the locating nut 217a. Then the conductive plate or bored tab end 208a of the hot-line 208b, is fitted over the threaded end 207a of the contact or contact bolt 207, tightly, to carry current therefrom, and from the tab 208a the hotline 208b extends within insulation 208c, as the "hotline" or positive insulated conductor core 208, for connection to the panel box 209, FIG. 19, as aforesaid.

A metallic washer 221, about the threaded rod 203, seats upon the insulative bushing 206. A locating nut 22a is shown threaded, face upwardly, upon the upper threaded rod 203 to bear upon the said metallic washer 221, and in turn a corresponding nut 22b is shown threaded, face downwardly, upon the upper end of the threaded rod 203 to bear face to face upon the locating nut 222a and serve as a locknut.

Noticeably, the upper rubber bushing 206 has a reduced-diameter portion 206a, which may be press fitted downwardly into the bore 219 through the load bed, or through the bracket 205 extending therefrom. This bore 219 is some bit lager than the diameter of the upper threaded rod 203 that passes therethrough. Below the load bed, or bracket 205 extending therefrom, the metallic spherical shell segment 261a, concavity downwardly, is installed about the threaded rod 203 to extend upwardly into the aforesaid bore 219, with the spherical segment surface in contact with the bracket 205 along a ring of contact defined by the lowermost periphery of the bore 219. A locating nut 262a, threaded upwardly on the rod 203, positions the spherical shell segment 261a to bear against the bracket 205 along the contact ring of the bore 219, as aforesaid. A locknut 262b, on the rod 203, installed face upwardly, bears in locking engagement with the face of the locating nut 262a.

Space is thus left between the face of the reduced-diameter portion 206a of the rubber bushing 206, and the top surfaces of the spherical shell segment or washer 261a. As the bushing 206 and washer 261a are installed about the threaded rod 203 is this manner, it may be said that the rod 203 is connected to the bracket 205, (or load bed), by a substantially universal connection. This connection amounts in function to a universal joint connection for the amount of sideway or roll, pitch or longitudinal deflection, and vibration or vertical undulation that may be encountered between the upper and sensor connections or anchorages.

Continuing in detail, the upper end 202a of the upper tubular member 202 is of reduced diameter to provide outwardly thereof a shoulder 202b upon which seats a metallic washer 227 to bear against the undersurface of the head of the adapter nut 226. The shank of the adapter nut 226 is externally and internally threaded, as shown in FIG. 20A, with the lower end of the threaded rod 203 being received therethrough, and with the upper portion of the upper tubular member 202 being threaded upwardly thereon so that the washer 277 is bound between the shoulder 202b and the undersurface of the head of the adapter nut 226.

An insulative tubular bushing 229, as of neoprene, is press fitted into the lower end of the smooth hollow bore 203a through the threaded rod 203, wit a flange 229a on the lower end of the neoprene bushing 229 to bear insulatively upon the lower end face of the threaded rod 203, while therebelow the head 207b of the contact bolt 207, (which comprises the contact button), bears upwardly on the insulative flange 229.

As shown in FIGS. 20 and 20A, the lower tubular member 211 is shown intertelescoped upwardly into the upper tubular member 202, with such lower tubular member 211 comprising part of the lower contact carrier 210, and having intertelescoped upwardly thereinto, in turn, a contact tube 230 having a washer 231 seated on top thereof with a machine screw 232 threaded downwardly into the upper end of the contact tube 230, with head 232a comprising the contact button of the lower contact assembly 233.

Referring now to FIG. 20B, a contact rod 234 is shown extending through an upper brass washer 235a, a compression spring 236, and a lower brass washer 236a, the upper end of the spring 236 being affixed to the underface of the upper brass washer 235a, and the lower end of the spring 236 being affixed to the upper face of the lower brass washer 235b. An upper head 234a on the upper end of the contact rod 234 bears upon the upper face of the upper brass washer 235a, and a lower head 234b on the lower end of the contact rod 234 bears upwardly against the underface of the lower brass washer 235b. At least one of the heads 234a, 234b, is swaged or formed as a last step to complete the contact rod and spring assembly 237.

The lower head 234b of the contact rod 234 is shown in FIG. 20B as resting on the upper end face of a lower threaded rod 212, with the lower end face of the lower tubular member 211 resting upon a washer 225 upon the upper face of a locating nut 239 that has been threaded, face upwardly, upon the upper end of the lower threaded rod 212 for a predetermined distance in calibration. Centrally upon the lower threaded rod 212 and spaced below the locating nut 239, a succession of elements are shown installed. First a locknut 240a with face lowermost to bear on a locating nut 240b with face uppermost. Then a lower metallic spherical shell segment 261b or washer, concavity upward, which in installation is confined between the locating nut 240b and the upper peripheral ring of a bore 244 in a bracket or element 214, which is in turn supported above the conventional vehicle axle, not shown. Such axle, as aforesaid, supports the conventional leaf spring assembly which in turn supports the load-supporting area or vehicle bed, (or the bracket 205 which extends therefrom), as shown in FIG. 20A.

A lower rubber insulator or bushing 215 is shown upon the lower threaded rod 212, to bear upwardly against the bracket 214. Such bushing 215 has a reduced diameter portion 215a thereon, which extends or projects upwardly, as by press fitting into the bore 244 in the axle supported bracket 214. As thus installed there is some space or clearance between the top surface of the projection 215a and the lowermost surface areas of the metallic spherical shell segment or washer 261b.

The respective segment or washer 261b, together with the lower rubber bushing 215, including its projection 215a, together cooperate and substantially universally connect the lower threaded rod 212 to the bracket 214. Thus, the sensor lower connection, (in correspondence with the hereinabove described upper connection by the upper rubber bushing 206 an upper segment or washer 261a with the bracket 205), amounts in effect to a substantially universal connection, functioning as a universal joint, as aforesaid. Thus the sensor lower connection can compensate for sidesway or roll, pitch or longitudinal lunge, and vertical vibration tending to occur in travel, between the load bed, or bracket 205 extending therefrom, and the axle-supported bracket 214.

The lower face of the aforesaid insulative bushing 215 seats upon a metallic washer 246 which in turn seats upon the top of a locating nut 247a, with a locknut 247b having been threaded, face upwardly, to bear against, and lock with, the face of the aforesaid locating nut 247a. Thus the nuts 247a, 247b complete the lower assembly of the sensor 260.

In this form of the invention, overload forces the load bed downwardly to bring the bolthead 207b, as upper contact button, into contact with the lower contact button 232a, comprised by the head of the machine screw 232, as it is installed in the top of the contact tube 230, with such button 232a to bear upon the washer 231 seated upon the upper face of the said contact tube 230. Current is thus carried toward ground by way of the contact tube 230, the upper brass washer 235a, the bolt-and-spring assembly 237, through the lower brass washer 235b, and through the lower contact rod head 234b of the bolt-and-spring assembly 237, to the lower threaded rod 212. From the lower threaded rod 232 ground-directed current passes through the locating nut 240b, by way of the metallic spherical shell segment 261b, to the axle means supported bracket 214.

In this form of invention, a consideration of FIG. 20A shows that, for purposes of illustration, some clearance is shown between the lower tubular member 211 and the upper tubular member 202, and in the design of this sensor 260 no tolerance consideration is given to carrying ground circuit between the two intertelescoped parts for grounding upwardly, as at the load bed, or bracket 205 that extends therefrom.

Also, it should be noted that in this form of the invention, as in the form shown in FIGS. 19, 19A, 19B and 19C, the spring 236 buffs against increased overload causing over travel of the contact tube 230 downwardly. The design of the spring 236 in this form is in correspondence with that of the spring 236 hereinabove described.

Figure 24:
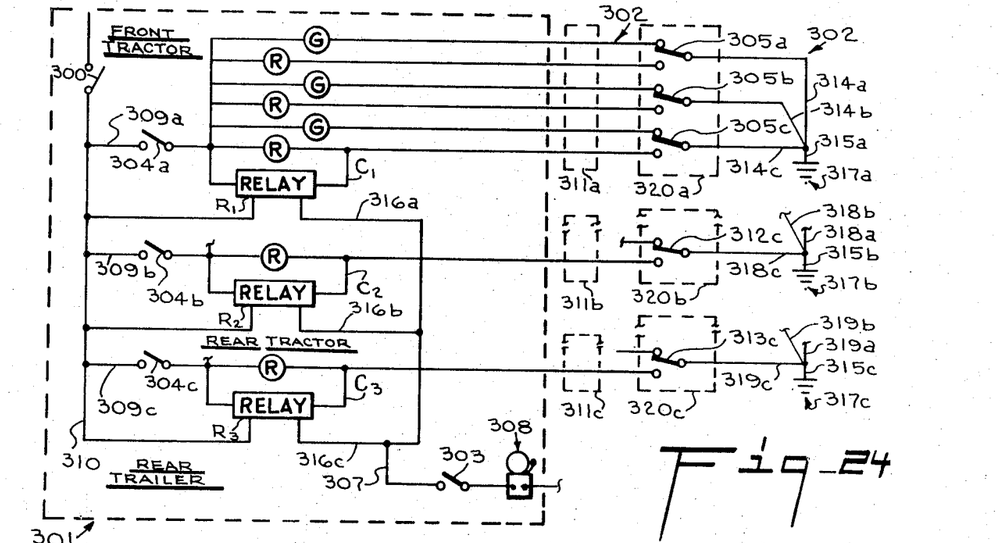
FIG. 24 is a wiring diagram of a three overload sensor arrangement, with each having three single-pole, double-throw switching devices to indicate full load and degrees of load.
Figures 25, 26:
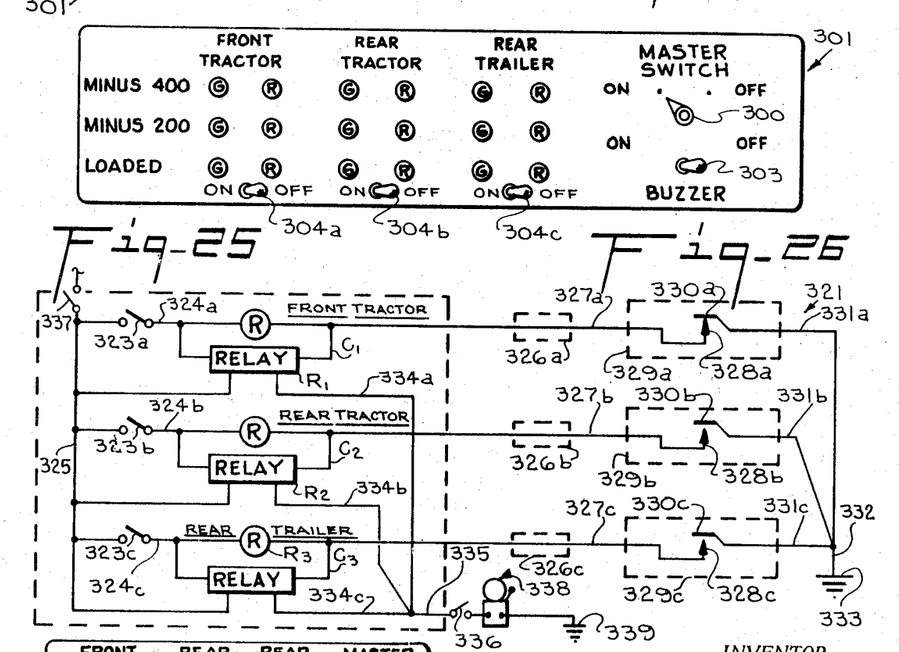
FIG. 25 is a view of an a illustrative panelboard for employment with the wiring diagram shown in FIG. 24.
FIG. 26 is a wiring diagram for a multiplicity of sensors adapted to give signal (light and buzzer) remote from indicator switch closure points.

As shown in FIGS. 24 and 25, wiring diagram circuitry 302 and a panel board 301 are respectively disclosed to indicate successive load conditions by overload sensor switches below each of three respective load beds. Thus three of such overload sensor switches are indicated as being mounted under each of three sets of axles, namely, a FRONT TRACTOR, a REAR TRACTOR and a REAR TRAILER in tandem extension. From a positive-side powerline 310 having a master switch 300 therein, a circuit 316a extends to connect with a circuit 307 having a bell or buzzer 308 therein in series with a switch 303 for turning it on and off. The circuit 307 thence extends to ground or to the opposite or negative side of the source of electrical power.

Also, a circuit 309a extends from the positive side powerline 310, and includes therein the FRONT TRACTOR switch 304a, which, when closed, carries current to six parallel-extending conductors designated alternately G (green) and R (red) corresponding with the color of flash or indicator lights therein. The conductors G and R connect with a connection block 311a exterior of the panelboard 301, and thence extend to a switch unit 320a beneath the particular FRONT TRACTOR load bed, where three load indicator switches, as hereinabove described, are connected to serve as single-pole, double-throw switches 305a, 305b, 305c which are held normally in contact with the respective G (green) conductors of the alternately disposed G and R conductors, as disclosed. From the switches 305a, 305b, 305c, respective conductors 314a, 314b and 314c extend to a common conductor 315a to a ground 317a. A conductor C₁, parallel with the R (red) conductor from the switch 305c, includes therein the coil, not shown, which actuates the aforesaid switch in the RELAY R₁.

To check FRONT TRACTOR loading, the master switch 300 is turned from "OFF" to "ON" position, the buzzer switch 303 is turned from "OFF" to "ON" position, the switch 304a is closed by moving the switch 304a to "ON" position, thus to free the switches 305a, 305b and 305c to move, responsive to load increase, from G contact closing position to R contact closing position. This orientates the circuitry associated with the load indicator switches, calibrated in elevation, so they function as single-pole, double-throw switches 305a, 305b, 305c, as aforesaid. Then, as load is increased on the FRONT TRACTOR load bed toward MINUS 400 pounds, the single-pole, double-throw switch 305a is switched from G to close contact to R (red), which stays on until the load condition is reached. Then as load is further increased toward MINUS 200 pounds, the single-pole, double-throw switch 305b is switched from G to close contact to R (red), which stays on until overload is reached. At about this point in time, the single-throw double-throw switch 305c is switched from G (green) to close contact to R (red). This also lets current flow through circuit C₁ of the RELAY R₁ to energize the relay to close circuit 316a to the circuit 307 which includes the switch 303 and also the bell or buzzer 308, as aforesaid.

Since the alternate G (green) and R (red) conductors and switch arrangement of the switch units are the same in diagram for the REAR TRACTOR and REAR TRAILER load checking, as in the case of the FRONT TRACTOR, this circuitry is omitted in the wiring diagram 302, but with the lower part of the circuitry for these vehicles being shown. Thus, there is shown as panel wiring for the respective REAR TRACTOR and REAR TRAILER, circuits 309b, 309c, from the positive side 310 of the powerline, with switches 304b, 304c therein, with circuit being carried to overload conductors R (red) with respective relay coil circuits C₂, C₃ in parallel with the respective sensor conductors R. Also the panelboard wiring includes the RELAY R and the Relay R₃ in the respective relay switch circuits 316b, 316c.

Also, for the respective REAR TRACTOR and REAR TRAILER, the wiring diagram 302, exteriorly of the panelboard wiring 301, shows the respective overload closure, single-pole, double-throw switches connected at respective connection blocks 320b, 320c, to the respective overload conductors R from the panelboard; and with respective conductors 318c, 319c from switch units 320b, 320c extending to respective junctions with conductors 318b, 318a, and with conductors 319b, 319a. The conductors 318b, 318a and 319b, 319a obviously extend from earlier operative single-pole, double-throw switches for the respective REAR TRACTOR and REAR TRAILER check loading, corresponding with the respective single-pole, double-throw switches 305b, 305c, shown with the FRONT TRACTOR check load wiring. Also, from the respective junctions, respective ground conductors 315b, 315c carry circuit to respective grounds 317b, 317c.

Obviously, the panelboard manipulation and corresponding circuitry operation is the same, as for the FRONT TRACTOR, hereinabove described. The buzzer sounding is discontinued by manually throwing the switch 303 to "OFF" position. Then, as overload is corrected and a safe margin of load beneath over load is taken off, the successive lights in the conductors R go out and the green lights G come on in the G (green) conductor circuits. Then, the respective switches 304a, 304b, 304c may be turned to "OFF" position.

A less complicated wiring diagram 321 and panelboard 322 are shown in FIGS. 24 and 25, respectively, for use to indicate overload on a plurality of axles, as, for instance, a FRONT TRACTOR, a REAR TRACTOR, and a REAR TRAILER. In this arrangement respective switches 323a, 323b and 323c are shown in open position in the wiring diagram and in "OFF" position on the panelboard.

Figure 27:
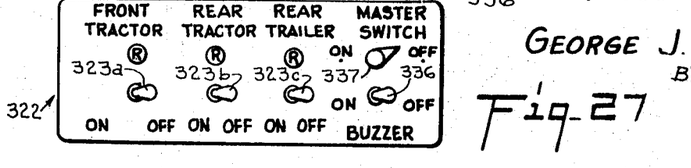
FIG. 27 is a view of an illustrative panel for employment with the wiring diagram shown in FIG. 26.

Such switches 323a, 323b, 323c are in respective circuits 324a, 324b and 324c from the positive side 325 of a powerline and connect with conductor R having sensor lights (red) in them, connector blocks 326a, 326b, 326c have the respective conductors R connected thereinto, and these extend as the positive side, or "hot" wire conductors 327a, 327b, 327c to the respective positive contacts 328a, 328b, 328c of overload indicator switches 329a, 329b, 329c. From the respective negative side contacts 330a, 330b and 330c respective conductors 331a, 331b, 331c are shown carrying circuit to a junction with a ground conductor 332 to a ground 333. Obviously, the contacts 330a, 330b, and 330c may themselves constitute grounds.

Coil circuits C₁, C₂ and C₃ for respective relays R₁, R₂ R are in parallel with the respective overload conductors R (red) for FRONT TRACTOR, REAR TRACTOR and REAR TRAILER. Also, relay switch circuits 334a, 334b, 334c, including switches, not shown, in the respective relays, extend from the positive side 325 of the powerline, having a master switch 337 therein, and connect at a junction with a conductor 335 which has in series therein a switch 336 and a bell or buzzer 388, the conductor 335 being shown extending to a ground 339.

In case of load checking each of the FRONT TRACTOR, REAR TRACTOR or REAR TRAILER, the switch in the circuit from the positive side powerline is closed, and also the buzzer or bell switch 336 is turned to "ON" position, and also the master switch 337 is turned to "ON" position. Then, as overload effects contact closure 329a, 330a, or 329b, 330b, or 329c, 330c, as the selected case may be, the respective light R (red) turns on or flashes, and the buzzer or bell 338 renders audible indicia or sensing. The buzzer switch 336 may be turned off manually, and as the load is reduced over the overload sensor switch, contact is broken and the red light R goes out.

The various structures hereinabove disclosed are adapted for association with the panel box 209 shown in FIG. 19, and for this reason behind the sensor 200 in that view, within parentheses the reference numerals 16, 100, 150 and 260 are added after the reference numeral 200. The adaptation of these sensors for such association will be apparent from a consideration of the respective views of FIG. 2, FIG. 12, FIG. 14, and FIGS. 20, 20A and 20B. Also, any of the aforesaid overload sensors 16 (FIG. 2), 100 (FIG. 12), 150 (FIG. 14), 200 (FIGS. 19, 19A, 19B and 19C), and 260 (FIGS. 20, 20A, 20B) are adapted for use to effect the switch closures of any of the switches 305a, 305b, 305c, series ending with 312c, and series ending with 313c, in the panel board diagram of FIG. 24 (panelboard of FIG. 25), and to effect the switch closures of any of the switches 328a, 330a; 328b, 330b; and 328c, 330c, in the panelboard diagram of FIG. 26, (panelboard of FIG. 27).

I claim:

1. An overload sensor for a load-supporting area that is yieldably supported, as by leaf spring means above vehicle axle means, said overload sensor including a first contact carrier universally suspended below said load-supporting area including means insulatively carrying a first contact suspended therewithin to extend therebelow, a second contact carrier downwardly universally connected to extend above said vehicle axle means and supporting a grounded second contact thereabove, said second contact carrier including a tubular member to receive said first contact carrier intertelescoped thereinto and relatively rotatable therewithin with relation thereto and into guidable contact therewith, compression spring means based within said insulative means above said first contact to bear yieldably downwardly thereagainst to yieldably buff against said first contact in its slidable upward travel in overtravel after overload effected, relative movement between and within said carriers, said sensor having an electrically powered indicia circuit connected through said insulative means above said compression spring to extend insulatively through and from said first contact carrier to carry current upon circuit closure through said first and second contacts, whereby to indicate the occurrence of overload upon said load-supporting area.

2. An overload sensor for a load-supporting area that is yieldably supported, as by leaf spring means above vehicle axle means, said sensor including a first contact carrier universally suspended below said load-supporting area, a second contact carrier intertelescoped within, and relatively rotatable within said first contact carrier and universally supported above said vehicle axle means and disposed for contact closure upon relative movement between said contact carrier and universally supported above said vehicle axle means and disposed for contact closure upon relative movement between said contact carriers, said second contact carrier insulatively mounting a second contact therein within its lower end and from which extends an insulated conductor, a first contact normally supported within said first contact carrier, also compression spring means based within said first contact carrier above said first contact to bear yieldably downwardly thereagainst to yieldably buff against said first contact in its slidable upward travel in overtravel after overload effected relative movement between said carriers has carried said first contact into grounding contact closure with said second contact, said insulated conductor extending from said lower end of said universally supported, first contact carrier to a source of electrical power and to carry circuit means operative upon contact closure to sense overload.

3. An overload sensor for a load-supporting area that is yieldably supported, as by leaf spring means above vehicle axle means, said overload sensor including a first contact carrier universally suspended below said load-supporting area including means insulatively carrying a first contact therein for disposition in extent downwardly therewithin, a second contact carrier downwardly universally connected to extend above said vehicle axle means and intertelescoped within, and relatively rotatable within said first contact carrier, a second contact within said second contact carrier and yieldably supported therein by compression spring means to upstand around an included ground rod which bases upon said second contact carrier and intertelescopes upwardly into said second contact to carry ground contact therefrom to said second contact carrier, whereby after overload effects contact closure between said first and second contacts, said compression spring means buffs against further downward travel of said second contact responsive to further load upon said load-supporting area, said sensor having an electrically powered sensing circuit connected through and from said first contact above said first contact carrier to carry circuit, upon circuit closure through said first and second contacts, to sense the occurrence of overload upon said load-supporting area.

4. An overload sensor as claimed in claim 3, which includes means to insulate said second contact carrier from grounding through connection above said vehicle axle means, in which said second contact carrier is grounded through said first contact carrier, and which includes ground strap means to carry ground from said first contact carrier to said load-supporting area.

5. An overload sensor as claimed in claim 3 in which said source of electrical power comprises the storage battery of a motor vehicle prime mover which draws behind it the vehicle providing the vehicle axle means above which said load-supporting area is supported.

6. An overload sensor as claimed in claim 2, in which said first contact carrier is universally suspended below said load-supporting area by a first universal joint, and in which said second contact carrier is universally supported above said vehicle axle means by a second universal joint.

7. An overload sensor as claimed in claim 3, in which said load-supporting area comprises the bed of a truck.

8. An overload sensor as claimed in claim 3, which additionally includes a second overload sensor as thus claimed, in which said load-supporting area comprises the bed of a truck trailer, in which said vehicle axle means comprises a forward axle means of the truck trailer and a rearward axle means thereof, said overload sensor being disposed between the forward, underside of the trailer bed and said forward axle means, and said additional overload sensor being disposed between the rearward, underside of the trailer bed and said rearward axle means.

9. An overload sensor as claimed in claim 3, which additionally includes three more overload sensors as thus claimed, in which said load-supporting area comprises the bed of a truck trailer, in which said vehicle axle means comprises a forward axle means of the truck trailer and a rearward axle means thereof, two of the aforesaid sensors being disposed between the respective left and right forward underside areas of the truck trailer bed, and said forward axle means, and the other two of the aforesaid sensors being disposed between the respective left and right rearward underside areas of the truck trailer bed, and said rearward axle means.

10. An overload sensor as claimed in claim 3, in which said second contact carrier is downwardly universally connected to extend above said vehicle axle means by a support member, in which said vehicle axle means comprise first ans second axles of a tandem unit, a pin connected to and upstanding from said first axle, an upright member connected to and upstanding from said second axle, a tubular member extending around said pin and thereabove and based upon said first axle, an upright member connected to and upstanding from said axle, said support member being connected at one end to said tubular member and provided a yoke at the other end thereof, and a transverse pivot pin connecting said yoke to the upper end of said upright member.

* * * * *